US008554259B2

(12) United States Patent
Ramasamy et al.

(10) Patent No.: US 8,554,259 B2
(45) Date of Patent: Oct. 8, 2013

(54) METHOD AND APPARATUS TO IMPROVE THE ROBUSTNESS OF A WIRELESS COMMUNICATION LINK

(75) Inventors: Venkatasubramanian Ramasamy, San Jose, CA (US); Giri Prassad Deivasigamani, San Jose, CA (US); Srinivasan Vasudevan, Sunnyvale, CA (US); Mohit Narang, Cupertino, CA (US); Longda Xing, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 767 days.

(21) Appl. No.: 12/703,652

(22) Filed: Feb. 10, 2010

(65) Prior Publication Data

US 2011/0143805 A1    Jun. 16, 2011

Related U.S. Application Data

(60) Provisional application No. 61/286,341, filed on Dec. 14, 2009.

(51) Int. Cl.
*H04B 7/00*        (2006.01)
(52) U.S. Cl.
USPC ............... 455/522; 455/67.11; 455/127.1; 455/67.13; 455/501; 370/318; 375/346
(58) Field of Classification Search
USPC ......... 455/67.13, 63.1, 501, 450, 452.1, 464, 455/522, 127.1, 67.11, 69, 517, 68, 88, 561, 455/318; 370/328, 230, 432, 310, 346; 375/141, 346, 348, 146, 135, 295, 297, 375/358
See application file for complete search history.

(56) References Cited

U.S. PATENT DOCUMENTS 6,198,910 B1    3/2001   Hanley
6,477,355 B1 *  11/2002  Grayson et al. .......... 455/13.4
(Continued)

FOREIGN PATENT DOCUMENTS

WO    94/19876    9/1994
WO    99/67899    12/1999
(Continued)

OTHER PUBLICATIONS

International Search Report for PCT Application No. PCT/US2010/059930 dated Feb. 9, 2011.

(Continued)

*Primary Examiner* — Sujatha Sharma
(74) *Attorney, Agent, or Firm* — Fay Kaplun & Marcin, LLP

(57) ABSTRACT

A method and apparatus to improve the robustness of a wireless communication link between a base station and a mobile communication device. The method increases power selectively on portions of an uplink communication signal transmitted from the mobile communication device to the base station. The method monitors a quality metric value at the mobile communication device and sets the transmit power level of the first portion of an uplink communication signal to the first power level, if the monitored quality metric value is in a first range of quality values, or sets the transmit power level of the first portion of the uplink communication signal to a second power level, if the monitored quality metric value is in a second range of quality values. The first portion of the uplink communication signal includes control signals used by a base station to maintain connection of the wireless communication link.

25 Claims, 8 Drawing Sheets

(56) References Cited

U.S. PATENT DOCUMENTS

| | | | |
|---|---|---|---|
| 6,650,904 B1 | 11/2003 | Lin et al. | |
| 6,804,530 B2 * | 10/2004 | Chheda et al. | 455/522 |
| 7,181,170 B2 | 2/2007 | Love et al. | |
| 7,328,038 B2 | 2/2008 | Hellwig et al. | |
| 7,454,222 B2 | 11/2008 | Huang et al. | |
| 7,466,776 B2 | 12/2008 | Yuan et al. | |
| 8,213,867 B2 * | 7/2012 | Zhang et al. | 455/62 |
| 2003/0109274 A1 | 6/2003 | Budka et al. | |
| 2006/0223447 A1 * | 10/2006 | Masoomzadeh-Fard et al. | 455/69 |
| 2008/0280638 A1 | 11/2008 | Malladi et al. | |
| 2009/0042596 A1 * | 2/2009 | Yavuz et al. | 455/522 |
| 2011/0201364 A1 * | 8/2011 | Capuozzo et al. | 455/466 |
| 2011/0201377 A1 * | 8/2011 | Kazmi | 455/522 |
| 2011/0300805 A1 * | 12/2011 | Gaikwad et al. | 455/63.1 |

FOREIGN PATENT DOCUMENTS

| | | |
|---|---|---|
| WO | 2004/091114 | 10/2004 |
| WO | 2004/100394 | 11/2004 |

OTHER PUBLICATIONS

Written Opinion for PCT Application No. PCT/US2010/059930 dated Feb. 9, 2011.

\* cited by examiner

METHOD AND APPARATUS TO IMPROVE THE ROBUSTNESS OF A WIRELESS COMMUNICATION LINK

CROSS REFERENCE TO RELATED APPLICATIONS

This patent application takes priority under 35 U.S.C. 119 (e) to U.S. Provisional Patent Application Ser. No. 61/286,341 entitled, "IMPROVING THE ROBUSTNESS OF A WIRELESS COMMUNICATION LINK" by Ramasamy et. al. filed Dec. 14, 2009 that is also incorporated by reference in its entirety for all purposes.

TECHNICAL FIELD

The described embodiments relate generally to wireless mobile communications. More particularly, a method is described for improving robustness of a communication link by selectively increasing power transmitted on portions of a signal.

BACKGROUND OF THE INVENTION

Mobile communication devices can communicate with a base station using one or more different protocols under varying communication link conditions. Communication signals received by the base station can be attenuated significantly by radiated power dissipation as the distance to the mobile communication device increases. This signal attenuation can increase susceptibility of the received communication signals to noise interference. Communication protocols typically divide the communication signal into portions that contain user generated data and supplemental information used for control of the communication link. Certain portions of the communication signal can be more important than other portions of the signal for controlling and maintaining integrity of the communication link between the base station and the mobile communication device. Corruption of the control portions of the signal can disrupt the communication link; thus it is desirable to guarantee high quality reception of the control portions of the signal. Increasing the power transmitted for the communication signal can increase the signal strength relative to interference and noise; however, communication protocols can set limits on the maximum power radiated by mobile communication devices in order to restrict total radio frequency energy absorbed by a user or to minimize radio interference between the mobile communication device and other devices using the same radio frequency bands. Thus there exists a need for a method for improving the robustness of a wireless communication link within the limitations of the total transmitted power of the mobile communication device

SUMMARY OF THE DESCRIBED EMBODIMENTS

This paper describes various embodiments that relate to methods and apparatus to improve robustness of a wireless communication link between a base station and a mobile communication device. A method and an apparatus adapted for the method that increases transmit power selectively on portions of an uplink communication signal transmitted from the mobile communication device to the base station are described.

In one embodiment, a method for improving robustness of a wireless communication link between a mobile communication device and a base station is described. The method can be carried out by adapting transmit power levels of the mobile communication device in accordance with a quality metric value associated with the wireless communication link. The method can comprise monitoring the quality metric value at the mobile communication device, and adaptively setting a transmit power level of a first portion of an uplink communication signal transmitted on the wireless communication link from the mobile communication device to the base station in accordance with the monitored quality metric value. In an embodiment, if the monitored quality metric value is in a first range of quality values then the transmit power level of the first portion of an uplink communication signal is set to a first power level value. If, however, the monitored quality metric value is in a second range of quality values, then the transmit power level of the first portion of the uplink communication signal can be set to a second power level value. The second transmit power level value can be greater than the first transmit power level value, thereby improving the robustness of the wireless communication link.

The method can repeatedly monitor the quality metric value and adaptively set transmit power levels in accordance with the monitored quality metric value while the wireless communication link is connected. Furthermore, the first portion of the uplink communication signal can include control signals used by a base station to maintain connection of the communication link with the mobile communication device.

In a further embodiment, the method can adaptively set a transmit power level of a second portion of the uplink communication signal in accordance with the monitored quality metric value. The transmit power level of the second portion of the uplink communication signal can be set to the first power level value, if the monitored quality metric value is in the first range of quality values, and to a third power level value, if the monitored quality metric value is in the second range of quality values. The third power level value can be less than the first power level value. In some embodiments, the total average transmitted power can be balanced across the first portion of the uplink communication signal using the second power level value and the second portion of the uplink communication signal using the third power level value.

In another embodiment, an apparatus is described that can improve the robustness of a wireless communication link between a mobile communication device and a base station. The apparatus can include a processor for monitoring a quality metric at the mobile communication device, and if the monitored quality metric is in a first range of quality values, setting the transmit power level of the first portion of an uplink communication signal to the first power level. If, however, the monitored quality metric is in a second range of quality values, then the transmit power level of the first portion of the uplink communication signal can be set to a second power level. In the described embodiment, the monitoring and the setting can continue while the wireless communication link is connected.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
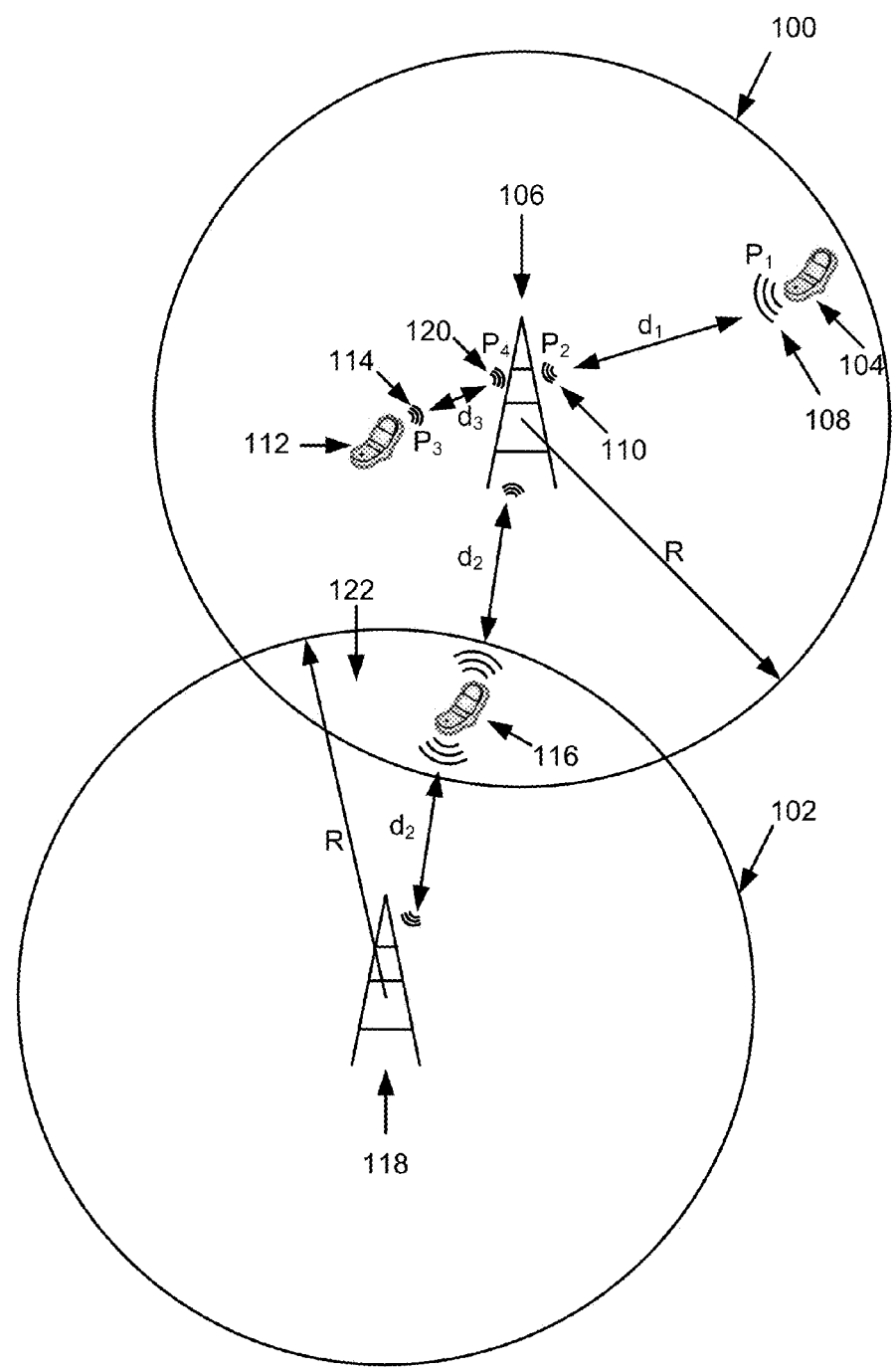
FIG. 1 illustrates mobile communication devices communicating with base stations in two overlapping wireless cells.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile communication devices, such as a cellular telephone or a wireless personal digital assistant, can be designed to operate under a variety of conditions. For example, due to the fact that a user can operate a mobile communication device while traveling, it is expected that the mobile communication device can operate at significant variations in distance from a base station. Moreover, the base station can typically serve multiple mobile communication devices simultaneously resulting in possibly one or more of the mobile communication devices interfering with each other. This interference is likely for those mobile communication devices that can share the same or nearby frequency bands.

It is understood by those skilled in the art that the base station can manage uplink communication signals from multiple mobile communication devices that share the same wireless communication cell by setting various transmission parameters for each mobile communication device. Transmission parameters can include, for example, a time period in which to transmit, a range of transmission frequencies to use, and a transmission power level. Because mobile communication devices can vary in distance from the base station, the quality of the communication link between the base station and the mobile communication device can vary significantly. For example, when the distance between the base station and the mobile communication device becomes too large, the quality of the communication leak can significantly degrade such that the communication link can become weak and unreliable. This degradation of the communication link can be especially problematic if there is significant noise and interference at the base station, when (or even if) the uplink communication signals are received.

Wireless communication protocols define a set of rules that specify how information can be transmitted between two wireless communication devices, including specific features such as data format, transmission frequencies, error correction mechanisms, and transmit power levels. The Global System for Mobile communications (GSM) is a well known, standardized wireless communication protocol for mobile communication devices. In addition to signals that can carry user speech or data, a wireless communication protocol can define control signals, regularly transmitted between a mobile communication device and a base station that provide information about the reliability of the communication link. If a sufficient number of the control signals are not recognized by the base station within a certain time period, then the base station can terminate the communication link.

A termination of the communication link, known as "radio interface failure," can occur in certain circumstances when acceptable (if imperfect) speech and data communication between the mobile communication device and the base station is still possible. Over sensitivity to errors in the control signals can cause a connection to terminate, even though speech signals can be still understood. This premature termination can occur because control signals and speech/data signals can be encoded separately and unequally in a particular communication system protocol. Advances in speech coding at low bit rates can enable improved speech transmission and comprehensibility at lower signal to interference ratios. Under these poorer operating conditions, control signals can be more vulnerable to a loss in signal integrity when received by the base station resulting in a dropped call. To improve the robustness of the communication link, one can improve the control signals reliable reception by increasing the transmit power used for these signals. To conserve battery power and remain within regulated power constraints, the transmit power of the speech/data signals can be simultaneously lowered or at least not increased. The mobile communication device can determine when to change the transmit power of the control signals by monitoring one or more quality metrics.

Particular embodiments are discussed below with reference to FIGS. 1 to 10; however, those skilled in the art will readily appreciate that the detailed description provided herein with respect to these figures is for explanatory purposes only and should not be construed as limiting to the embodiments given.

FIG. 1 illustrates wireless communication cell 100 and wireless communication cell 102 in accordance with the described embodiments. As shown, wireless communication cell 100 can include mobile communication device 104 that can communicate with base station 106. Multiple other mobile communication devices, such as devices 112 and 116, can also communicate with base station 106 within wireless communication cell 100 simultaneously with mobile communication device 104. Mobile communication device 116 can also communicate with base station 118 in an adjacent wireless communication cell 102. As is well known, radiated electromagnetic energy attenuates by the inverse square of the distance from its origin. In order to ensure that base station 106 can process received signals appropriately, mobile communication devices 104 and 116, located at distances $d_1$ and $d_2$ respectively from base station 106, can transmit to base station 106 at higher output power levels than mobile communication device 112 located at distance $d_3$ closer to base station 106, where distance $d_3$ is less than either distance $d_1$ or $d_2$. For example, radio signal 108 that originates at mobile communication device 104 can have a power level $P_1$ that is significantly higher than a power level $P_2$ associated with radio signal 110 received at base station 106. The received power level $P_2$ can be proportional to the transmitted power level $P_1$ divided by the square of the distance $d_1^2$ between mobile communication device 104 and base station 106.

The same analog amplifier circuitry in base station 106 can be used to receive signals from many different mobile communication devices, each device located at a different distance from the base station. Rather than change the analog gain settings of the base station amplifier circuitry for each signal received from a different mobile communication device, it is preferable that base station 106 receive signals at similar power levels from different mobile communication devices sharing transmission bandwidth within wireless communication cell 100. Normalizing the transmitted signals from mobile communication devices within wireless communication cell 100 by a power control method administered by base station 106 can enable analog receive circuitry at base station 106 to operate in a preferred range. Thus base station 106 typically can manage transmit power levels output by mobile communication devices within wireless communication cell 100.

In addition to compensating for distance attenuation, transmit signal power can also be increased at a mobile communication device to account for background noise and interference when transmitted signals are received at base station 106. If mobile communication device 112, located at distance $d_3$ from base station 106 ($d_3 \ll d_1$), transmits at power level $P_3$ that can be approximately the same as power level $P_1$ transmitted by mobile communication device 104, located at distance $d_1$ from base station 106, then it is possible that received signal 110 (corresponding to signal 108 attenuated by distance $d_1$) with power level $P_2 \ll P_1$ at base station 106 can be overwhelmed by interference from signal 120 with power level $P_4$ transmitted by mobile communication device 112. Therefore, in order to reduce the likelihood of signals from a device closer to a base station from overpowering signals from another device located further away from the base station, techniques of adaptively controlling the power transmit levels of mobile communication devices based at least upon their respective distances from a base station have been developed. These adaptive power transmit control techniques can, for example, reduce a transmit power level of a mobile communication device that is closer to a particular base station (for example mobile communication device 112 in FIG. 1 in relation to base station 106) compared to a mobile communication device located further away from the base station (such as mobile communication device 104). By adjusting transmit power levels of multiple devices in a wireless communication cell, received signals from both near and far mobile communication devices can reach the base station at approximately the same power level. Base station 106 can increase transmit power level $P_1$ of signals 108 from mobile communication device 104 located at distance $d_1$ and decrease transmit power level $P_3$ of signals 114 from mobile communication device 112 located at distance $d_3$ so that received signals 110 and 120 have similar power levels, i.e. $P_2 \approx P_4$. The transmit power levels of each mobile communication device in a wireless communication cell can be adaptively changed as the mobile communication devices move within the cell, changing their distance to the base station. Adaptive control of transmit power levels of communication devices 104, 112 and 116 in wireless communication cell 100 can be managed by base station 106.

In order to ensure minimal interference between multiple communication devices that share a common radio frequency band, the Federal Communications Commission (FCC) sets limits on the total radiated transmit power of mobile communication devices. These transmit power limitations can require the spectrum of radio frequencies emitted by the mobile communication device to be limited to less than a particular power spectral density mask across a band of adjacent frequencies or to an average power level transmitted during a particular time period. Similarly, communication standards (such as the aforementioned GSM mobile wireless protocol) can limit the specific absorption rate (SAR) allowed for a mobile communication device in order to minimize radio frequency energy absorbed by the body of a user of the mobile communication device.

Wireless communication cell 100 can have an effective operating range of radius R over which to communicate with mobile communication devices therein. Communication devices operating near the limit of the effective operative range R of the wireless communication cell 100, such as mobile communication device 104 in wireless communication cell 100 at distance $d_1$ from base station 106, can be required to transmit at higher power levels (to overcome radiated power loss and maintain robust communication link integrity). Even if mobile communication device 104 can operate at maximum transmit power levels, the quality of the communication link between base station 106 and mobile communication device 104 can degrade, because errors can still occur in signals received at base station 106. This increase in error rate can be especially significant when the received signal has a low signal to noise ratio (SNR) caused by the signal having inadequate signal strength compared with background noise and interference. An increase in error rate can cause a number of problems, such as garbled speech or corrupted data that can require re-transmission. Low SNR can also corrupt control signals that maintain the communication link between base station 106 and mobile communication device 104. It should be noted that mobile communication devices that operate near the center of wireless cell 100 (i.e. close to base station 106 such as mobile communication device 112) can lower their transmit power level to conserve battery power and to limit interference into devices sharing the same frequency band. However, this lowering of the transmit power level of communication devices operating at shorter distances to the base station 106 can also render them more vulnerable to increased levels of interference and noise. Weak, low power signals received at the base station can degrade uplink performance, resulting in dropped calls and poor perceived quality of service because the base station cannot "hear" the mobile communication device.

The operating range boundaries of adjacent wireless communication cells can overlap, as shown for example in FIG. 1 by wireless communication cells 100 and 102 overlapping in region 122. Mobile communication device 116 can be located at a far distance $d_2$ from base station 106 in wireless cell 100 and from base station 118 in wireless cell 102. Wireless communication cell overlap can permit handoff as a mobile communication device travels from one wireless communication cell to another; for example, mobile communication device 116 can be transferred from communicating with base station 106 in wireless communication cell 100 to base station 118 in wireless communication cell 102 when operating in the overlap region 122. Mobile communication device 116, however, can be vulnerable to call dropping during such a handoff, as received signals (including control portions thereof) can be weak when received at either the originating base station 106 or the receiving base station 118. The base station can increase the transmit power of the mobile communication device 116 but only to a maximum level permitted by specifications of the standards bodies. The maximum transmit power level may be insufficient to overcome attenuation incurred by signals traversing distance $d_2$ from the mobile communication device 116 to either base station 106 or 118. A method to increase the robustness of a communication link, particularly when a mobile communication device operates at maximum transmit power levels, is thus desirable to improve overall communication system performance.

Figure 2:
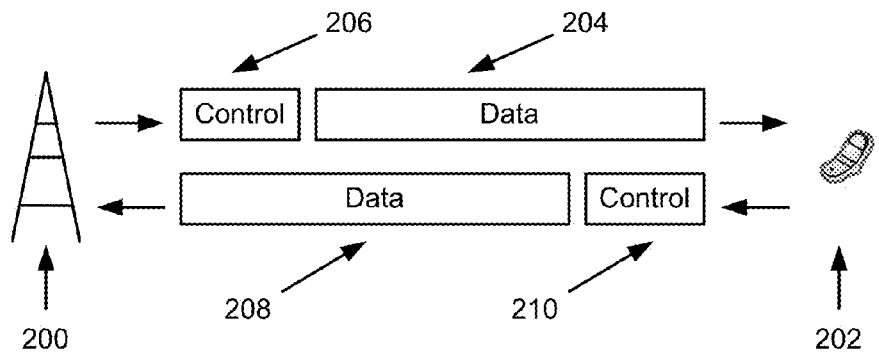
FIG. 2 illustrates two types of information communicated between a wireless device and a base station.

A base station can monitor received communication signals from a mobile communication device to estimate quality metrics for the communication link to the device. The quality of the communication link can vary substantially as the mobile communication device moves within a communication cell, thereby changing the distance to the base station and encountering different interference levels. Communication signals can be formatted according to a wireless communication protocol into a combination of speech/data portions that can carry encode user data as well as control portions that can carry control signals to manage the communication link between the device and the base station. FIG. 2 illustrates communication signals transmitted between a mobile communication device 202 and a base station 200 that include portions 204/208 dedicated for user data (such as compressed speech) and other portions 206/210 used for control of the communication link. Typically, a significantly greater portion of the communication signal can be dedicated to user data, while control information can be transmitted infrequently, but usually at regular intervals.

Figure 3A:
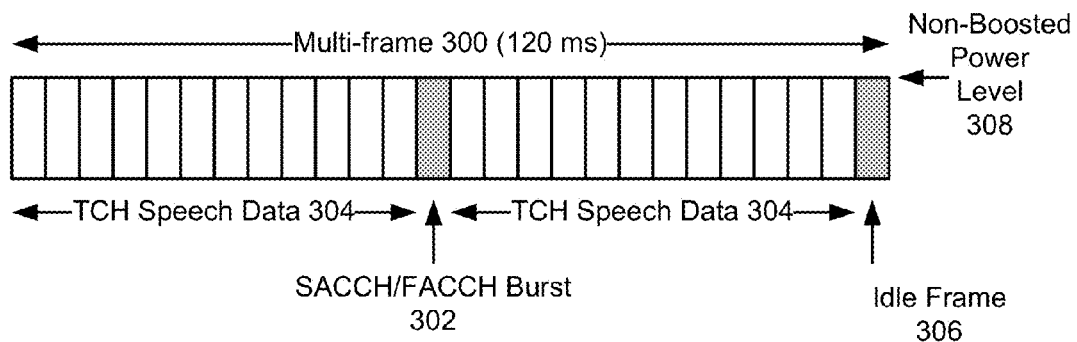
FIG. 3A illustrates a time division frame structure including speech data and control data transmitted at equal power levels.

FIG. 3A illustrates an exemplary GSM communication protocol format that divides a multi-frame 300 time period of 120 ms into 26 individual frames, with 24 frames 304 dedicated to traffic channel (TCH) speech data and a "slow" or "fast" associated control channel (SACCH/FACCH) burst frame 302 used for control. Each of the individual frames within multi-frame 300 is sent at an approximately equal "non-boosted" power level 308. The SACCH/FACCH burst 302 in FIG. 3A corresponds to the control signals 206/210 in FIG. 2, while the TCH speech data 304 corresponds to the data signals 204/208. The SACCH/FACCH control frame 302 can include timing control and power control to manage transmissions between the base station 200 and the mobile handset 202. The control portion 206 of the uplink communication signal sent from mobile communication device 202 can be monitored by base station 200 for signal integrity to ascertain if the communication link performance is sufficient to provide the quality of service required by the network. If base station 200 determines that the communication link performance is low, based on monitoring the SACCH/FACCH control frame 302 of the signal, then base station 200 can choose to disconnect the communication link with mobile communication device 202. Disconnection of the communication link can occur even when TCH speech data 304 frames are still usable. In some systems, for example, a base station can drop a communication link if a relatively small number of successive messages received in the SACCH/FACCH control frame 302 are determined to have poor quality. As the TCH speech data frames 304 can be encoded separately from the SACCH/FACCH burst control frame 302, poor quality in the SACCH/FACCH burst control frame 302 does not necessarily correspond to poor quality in the TCH speech data frames 304.

Figure 3B:
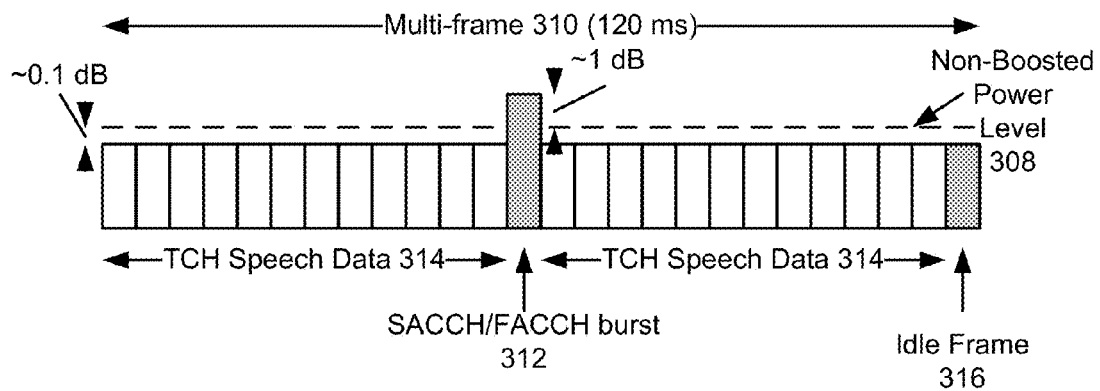
FIG. 3B illustrates the time division frame structure of FIG. 3A altered to transmit speech data and control data at different power levels.

To maintain a communication link when signals received by a base station are weakened by attenuation or masked by high levels of interference, one can seek to increase the radiated transmit power at the mobile communication device on at least the portion of the transmitted signal monitored by the base station for link integrity. As there are limitations on the total radiated transmit power, one cannot increase the transmitted power for all portions of signals sent by the mobile communication device to the base station. Instead, as shown in FIG. 3B, one can selectively increase the power of SAACH/FAACH burst control frames 312 within multi-frame 310 above the "non-boosted" power level 308, as these control portions of the transmitted signal can be used to monitor signal integrity of the multi-frame 310 signal when received at the base station. Note that the "non-boosted" power level 308 can correspond to a power level used by TCH speech data 304 and for SACCH/FACCH bursts 302 in FIG. 3A. Boosting the power level of control portions of the signal above speech data portions of the signal can provide higher power control portions when received at a base station, and the base station can more readily "hear" the stronger control portions of the signal and maintain the communication link. Thus increasing the transmit power on only a portion of the transmitted signal can increase the robustness of the communication link between the base station and the mobile communication device.

In some embodiments, the total transmit power averaged over multi-frame 310 can be required to be approximately constant whether or not the SACCH/FACCH control portion 312 of multi-frame 310 is power boosted. In particular, if the mobile communication device is transmitting at a maximum transmit power level, i.e. the "non-boosted" power level 308 is set to a maximum value possible for a given communication protocol, then increasing any portion of the multi-frame 310 can result in transmissions from the mobile communication device exceeding power regulation limits. To ensure total power transmission averaged across the entire multi-frame 310 from the mobile communication device remains within designated transmit power limits, one can lower the transmit power of all other signals (i.e. excluding the SACCH/FACCH control portion 312), including both TCH speech data frames 314 and idle frame 316, when increasing the power of the SACCH/FACCH control portion 312. As the SACCH/FACCH control portion 312 of the communication signal can occupy a limited fraction of the total transmission time per multi-frame 310, the SACCH/FACCH control portion 312 can be increased moderately in power briefly, while the remaining signals in the multi-frame 310 need be reduced only slightly. For example, as shown in FIG. 3B, the SAACH/FAACH control portion 312 can increase approximately 1 dB in power, which can substantially improve the likelihood that the communication link be maintained, while the TCH speech data portions 314 need be lowered by approximately only 0.1 dB to compensate for the higher power SACCH/FACCH control portion 312. Decreasing the TCH speech data 314 by a relatively small amount can allow acceptable speech/data decoding performance to be maintained between the mobile communication device and the base station.

Figure 4A:
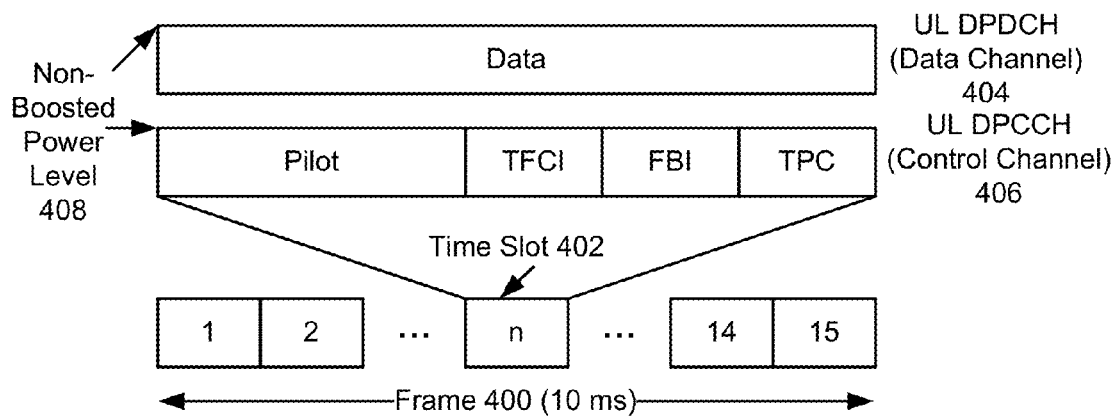
FIG. 4A illustrates a wideband code division frame structure including dedicated user data and channels.
Figure 4B:
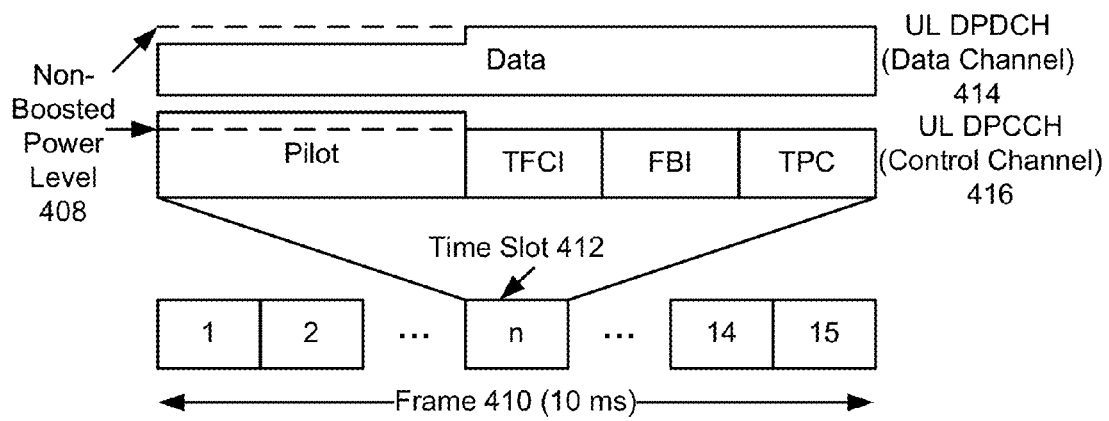
FIGS. 4B and 4C illustrate the wideband code division frame structure of FIG. 4A altered to transmit portions of the data and control channels at different power levels.
Figure 4C:
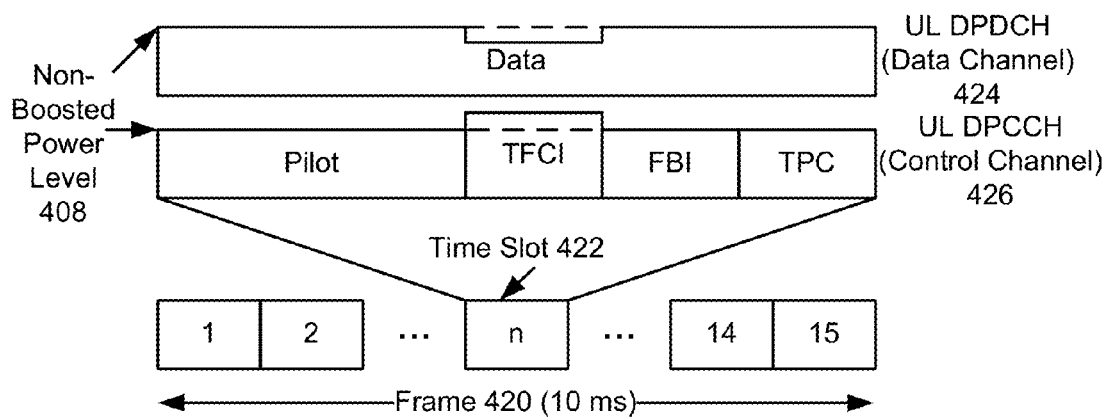

FIG. 4A illustrates an exemplary Universal Mobile Telecommunications System (UMTS) Wideband Code Division Multiple Access (WCDMA) communications protocol format using a 10 ms frame 400 of 15 successive time slots, each time slot containing both data and control information. During a time slot 402, an uplink (UL) dedicated physical data channel (DPDCH) 404 and a UL dedicated physical control channel (DPCCH) 406 can be transmitted simultaneously, with each channel spread by an orthogonal spreading code. The UL DPCCH 406 includes four parts: (1) a portion used to transmit pilot information that contain pre-determined patterns for synchronization and channel estimation, (2) a transport format combination indicator (TFCI) portion that contains bit rate and coding parameters, (3) a feedback indicator (FBI) portion used for closed loop format diversity, and (4) a transmit power control (TPC) portion used to request the base station change its transmit power levels. The base station can assess uplink communications signal integrity by monitoring at least one of the pilot portion and the TFCI portion of the uplink DPCCH. In order to increase the robustness of a communication link between a base station and a mobile communications device, the power level on at least one of the pilot portion and the TFCI portion can be increased, while a portion of the power level on part of the data portion can be simultaneously decreased to maintain a proper gain ratio as used without and change to power levels. As shown in FIG. 4B, the pilot portion within the UL DPCCH 416 can be increased above the non-boosted power level 408, and a proportional segment of the UL DPDCH 414 can be decreased below the non-boosted power level 408. As only a fraction of the UL DPCCH has its power increased, a similar fraction of the UL DPDCH has its power decreased to compensate. FIG. 4C illustrates increasing the power level of the TFCI portion of UL DPCCH 426 and decreasing the power level a fraction of UL DPDCH 424 relative to the non-boosted power level 408.

Choosing to increase the transmit power level of control portions of communication signals from a mobile communication device to a base station can be triggered by one or more conditions monitored at the mobile communication device, without intervention from the base station. For example, the mobile communication device can monitor the total average transmitted power level to determine if the maximum total average transmitted power level has been reached, which can indicate the mobile communication device is located far from the receiving base station. In some embodiments, the base station can control the total average transmitted power level of the mobile communication device by setting a power control level of the device in a downlink control message. The base station can choose to increase the total average transmitted power of the mobile communication device based on observing low power levels in signals that the base station receives. The mobile communication device can infer being located far from the base station if required by the base station in a downlink control message to increase its total average transmitted power level.

Figure 5:
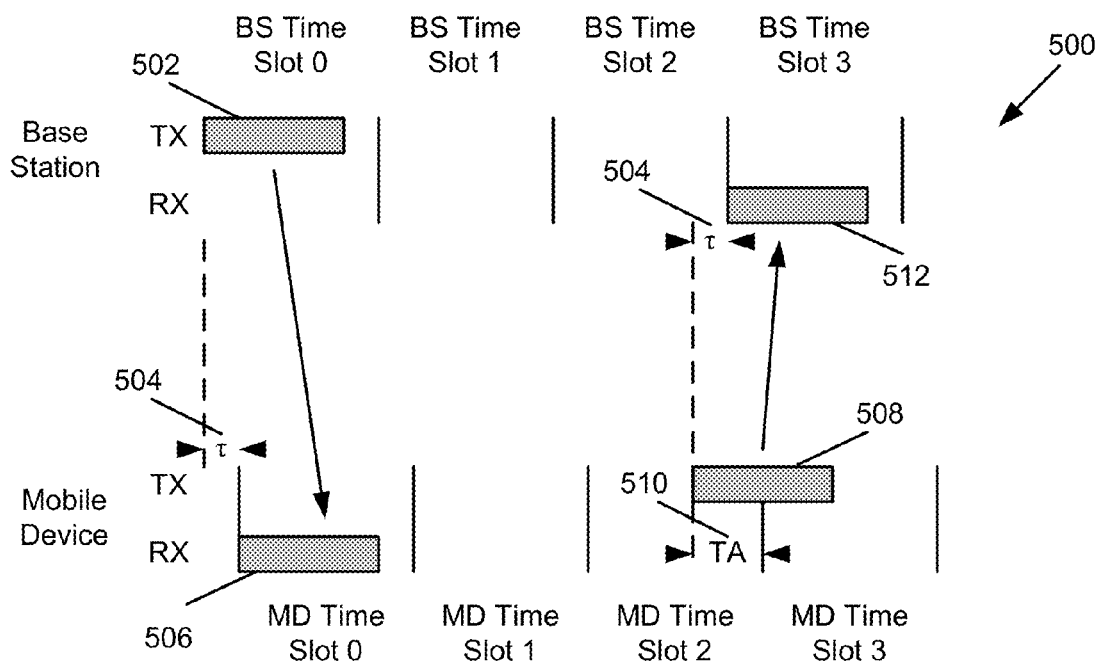
FIG. 5 illustrates propagation delay and timing advance for communication between a base station and a mobile communication device.

Alternatively, the mobile communication device can monitor an amount of timing advance (TA) required by the base station when transmitting bursts from the mobile communication device. This timing advance can relate indirectly to the distance of the device from the base station, just as for the power control level described above. As shown in FIG. 5, transmit and receive communication bursts at a base station can be aligned on time slot boundaries. For example, transmit communication burst 502 aligns with the beginning of BS time slot 0 and receive communication burst 512 aligns with the beginning of BS time slot 3. A base station can require that communication bursts received from different mobile communication devices in the same wireless communication cell be aligned to the base station's time slot boundaries when received at the base station. Two adjacent time slots at a base station can be used by two different mobile communication devices, and each of the mobile communication devices can be located at a different distance from the base station. To account for the varying distance between a mobile communication device and the base station, a mobile communication device can adjust when it starts the transmission of communication bursts to the base station. This timing adjustment is known as a "timing advance" of the transmitted communication burst, as the communication burst can be "advanced" before the beginning of the mobile communication device's time slot boundary. The base station can instruct the mobile communication device how much to "advance" the communication burst transmission to ensure that the transmitted communication burst arrives at the base station aligned with the base station's time slot boundaries.

FIG. 5 illustrates a communication burst 502 transmitted from a base station (BS) during BS time slot 0 and received as communication burst 506 at a mobile communication device (MD) during MD time slot 0. A propagation delay 504 of τ units is incurred by the communication burst 502/506 as it travels a distance from the base station to the mobile communication device. A communication burst transmitted in the reverse direction from the mobile communication device to the base station can incur the same propagation delay 504 τ as incurred by the communication burst transmitted in the forward direction. Thus, the mobile communication device can advance when it transmits communication burst 508 by a timing advance (TA) 510 of 2τ units with respect to the mobile communication device's time slot boundaries to account for the roundtrip propagation delay between the base station and the mobile communication device. As shown in FIG. 5, transmit communication burst 508 can be "advanced" from the beginning of MD time slot 3 into MD time slot 2 by TA 510, and a corresponding received communication burst 512 at the base station can align with BS time slot 3's initial boundary. Timing advance corresponds to propagation delay, and longer values of timing advance can correspond to longer propagation delay or equivalently greater distance between the mobile communication device and the base station. Thus, the mobile communication device can infer that communication bursts can travel longer distances and therefore be weaker in power when received at the base station if a high valued timing advance setting is required of the mobile communication device by the base station in a downlink control message.

Figure 6:
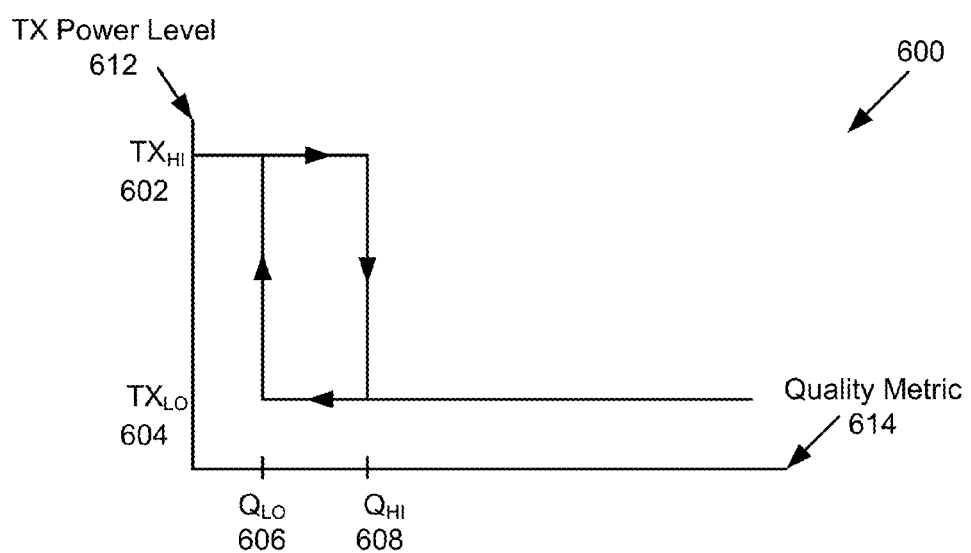
FIG. 6 illustrates a transmit power level varying with a quality metric.

The power control level or the timing advance setting required by a base station can provide an indication of a far distance between the mobile communication device and the base station, which can result in weak signals (and thus potentially poor received SNR) at the base station. The power control level and the timing advance settings can provide an indirect quality metric at the mobile communication device that can be monitored and used to determine when to change the transmit power level of portions of uplink communication bursts. FIG. 6 illustrates a graph 600 correlating a quality metric 614 and a transmit (TX) power level 612 for a mobile communication device. For values of the quality metric 614 in a range at or above a high quality value $Q_{HI}$ 608, the TX power level 612 can be set to a lower (or equivalently non-increased) value $TX_{LO}$ 604. For values of the quality metric 614 in a range at or below a low quality value $Q_{LO}$ 606, the TX power level 612 can be set to a higher (or equivalently increased) value $TX_{HI}$ 602. For values of the quality metric 614 between the low quality value $Q_{LO}$ 606 and $Q_{HI}$ 608, the TX power level 612 can retain a previously set transmit power level, either $TX_{HI}$ 602 or $TX_{LO}$ 604. The hysteresis shown in graph 600 can provide stability if measured quality metrics hover in a region between $Q_{LO}$ 606 and $Q_{HI}$ 608. Initially a mobile communication device can transmit a TX power level 612 at a lower transmit power level value $TX_{LO}$ 604 after establishing a communication link with a base station. If the monitored quality metric 614 falls below the low quality value $Q_{LO}$ 606, the mobile communication device can surmise that uplink communications bursts can be received with poor SNR at the base station. The mobile communication device can then increase the TX power level 612 to a higher value $TX_{HI}$ 602 on portions of the uplink communications bursts, such as the control portions, to improve the robustness of the communication link with the base station. The mobile communication device can continue to use the higher value $TX_{HI}$ 602 even if the quality metric increases above the low quality value $Q_{LO}$ 606 and not decrease to transmit power level 612 to the lower $TX_{LO}$ value 604 until the quality metric exceeds the higher quality metric $Q_{HI}$ 608. Other indicators of poor uplink SNR can also be inferred by the mobile communication device. For example, the mobile communication device can monitor performance of the downlink received signals for decoding errors. If the downlink signals are received poorly at the mobile communication device then uplink signals can also be received poorly at the base station, as both the downlink signals and the uplink signals can traverse similar paths between the base station and the mobile communication device. Downlink performance can be monitored using a measured or estimated performance parameter in the mobile communication device such as RxQUAL or CRC errors.

Under certain conditions, such as low battery power levels, the transmit power level adjustment applied to portions of an uplink communication burst can be changed to reduce power consumption by the mobile communication device. Higher transmit power levels on portions of the uplink communication burst can result in higher power consumption by the mobile communication device, even when lowering other portions of the uplink communication burst to keep the total average transmitted power at a comparable level without the power boost. This increased power consumption can occur because the amount of power consumed by analog amplifiers in the mobile communication device can be "non-linearly" related to the amount of power transmitted. In an embodiment, if a battery power level is below a pre-determined threshold in the mobile communication device, then no selective increase in the transmit power levels of portions of the uplink communication burst can be applied. In other embodiments, the selective power boost can be phased out gradually as shown in FIG. 7 based on a power storage metric monitored in the mobile communication device.

Figure 7:
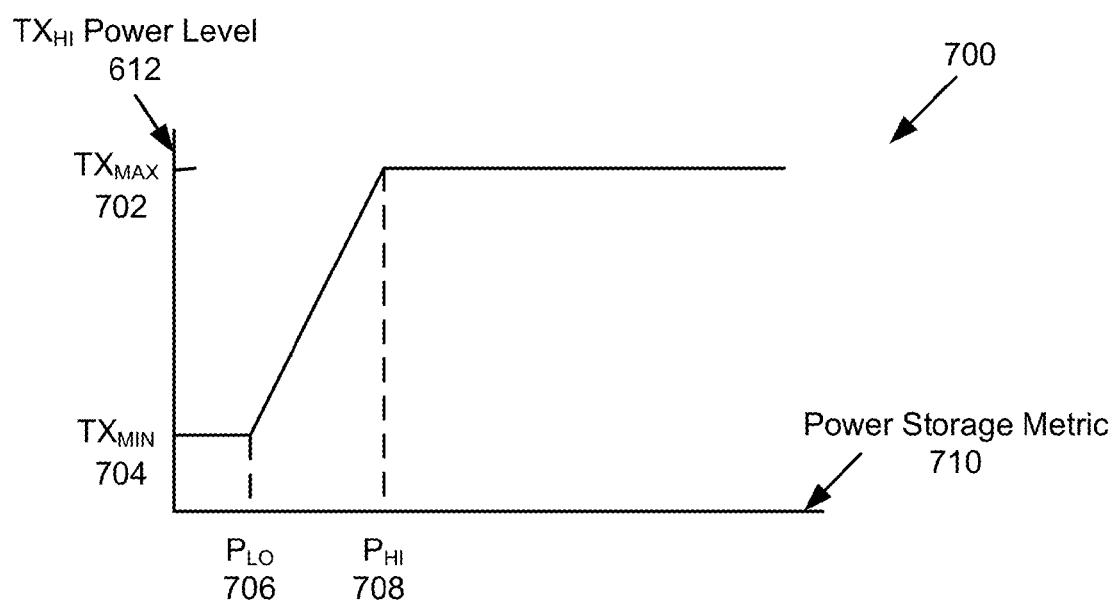
FIG. 7 illustrates a maximum transmit power level varying with a power storage metric.

FIG. 7 illustrates a graph 700 relating a power storage metric 710 to the higher transmit power level $TX_{HI}$ 612 that can be applied to portions of an uplink communication burst from a mobile communication device. For a power storage metric 710 value at or above a power storage level $P_{HI}$ 708, the higher transmit power level $TX_{HI}$ 612 that can be used when boosting a portion of the uplink communication burst can be up to a maximum higher transmit value $TX_{MAX}$ 702. In this case, the power storage metric 710 can indicate that the mobile communication device has sufficient reserve power stored that maximum transmit boost capability can be used without limitation. At lower power storage metric 710 values, such as at or below power storage level $P_{LO}$ 706, the higher transmit power level $TX_{HI}$ 612 can be limited to a minimum higher transmit value $TX_{MIN}$ 704. In this case, the power storage metric 710 can indicate that the mobile communication device has insufficient reserve power stored so that transmit power should be conserved. In some embodiments, $TX_{MIN}$ 704 can be a value such that no transmit power boost occurs. If the power storage metric 710 falls in between the power storage levels $P_{LO}$ 706 and $P_{HI}$ 708, the higher transmit power level $TX_{HI}$ 612 can fall between the minimum value $TX_{MIN}$ 704 and the maximum value $TX_{MAX}$ 702. An intermediate $TX_{HI}$ power level 612 that falls between $TX_{MAX}$ 702 and $TX_{MIN}$ 704 can balance between boosting transmit power levels for improving robustness of the communication link and conserving battery power consumption at the mobile communication device. FIG. 7 illustrates a linear curve between $TX_{MIN}$ 704 and TXMAX 702; however, other curve shapes connecting the minimum $TX_{MIN}$ 704 and maximum TXMAX 702 power levels can also be used. The minimum higher transmit value $TX_{MIN}$ 704, in a representative embodiment, can be the "normal" non-boosted transmit level $TX_{LO}$ 604 used when the quality metric 614 is at or above a high value $Q_{HI}$ 608. The power storage metric graph 700 in FIG. 7 can be seen to modify the quality metric graph 600 of FIG. 6.

Figure 8:
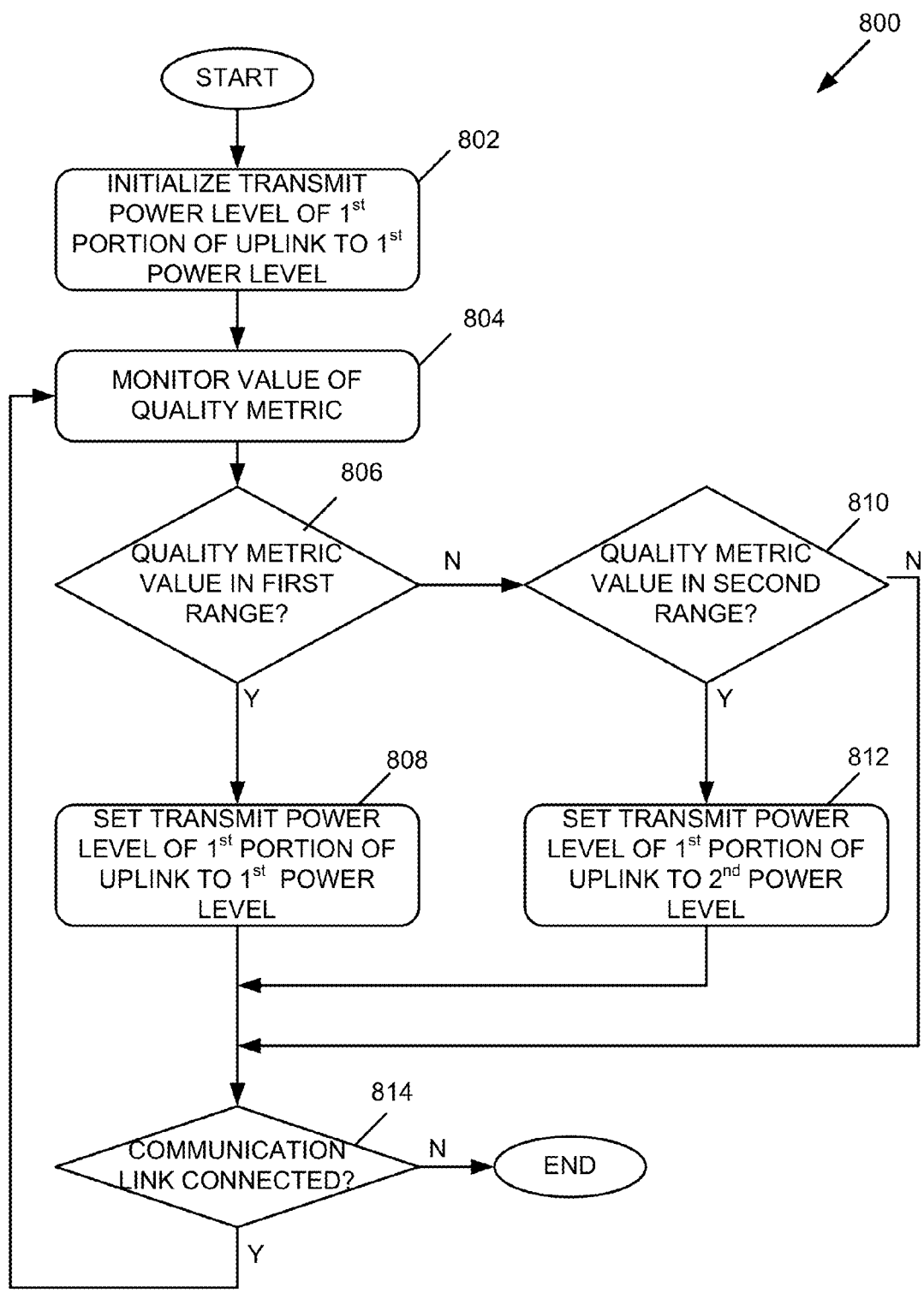
FIG. 8 illustrates a representative method for improving the robustness of the communication link.

FIG. 8 illustrates a representative method 800 to improve the robustness of a communication link between a mobile communication device and a base station. In step 802, a transmit power level for a first portion of uplink communication bursts between the mobile communication device and the base station can be initialized to a first power level. This first power level, for example, can be considered a "normal" non-boosted power level, and the first portion of the uplink communication burst can be a frame of control signals (such as the SACCH/FACCH burst 302 frame shown in FIG. 3A within a multi-frame 300). In step 804, the mobile communication device can monitor a quality metric, such as a transmit power control level or a timing advance value as described above, on a regular basis, for example once per integer number of multi-frames 300 received or transmitted. In step 806, the quality metric value can be tested to determine if it falls within a first range of values. The first range of values can be, for example, at or above $Q_{HI}$ 608 as shown for quality metric 614 in FIG. 6. If it is determined in step 806 that the quality metric value falls within the first range of values, then in step 808 the transmit power level for the first portion of uplink communication bursts between the mobile communication device and the base station can be set to the first power level. High quality metric levels can indicate that transmit power levels can remain at "normal" non-boosted levels. If it is determined in step 806 that the quality metric value does not fall within the first range of values, then in step 810 the quality metric value can be tested again to determine if it falls within a second range of values. The second range of values, for example, can be at or below $Q_{LO}$ 606 as shown for quality metric 614 in FIG. 6. If it is determined in step 810 that the quality metric value falls within the second range of values, then in step 812 the transmit power level for the first portion of uplink communication bursts between the mobile communication device and the base station can be set to a second power level. Low quality metric levels can indicate that transmitted uplink communication bursts can be weakly received at the base station and therefore be susceptible to corruption by noise or interference. The transmit power level of the first portion of uplink communication bursts can be increased to improve performance in a noisy, interfering environment. In step 814, if the communication link between the mobile communication device and the base station remains connected, then the monitoring and testing of the quality metric in steps 804, 806 and 810 and setting the transmit power level steps 808 and 812 can be repeated.

Figure 9:
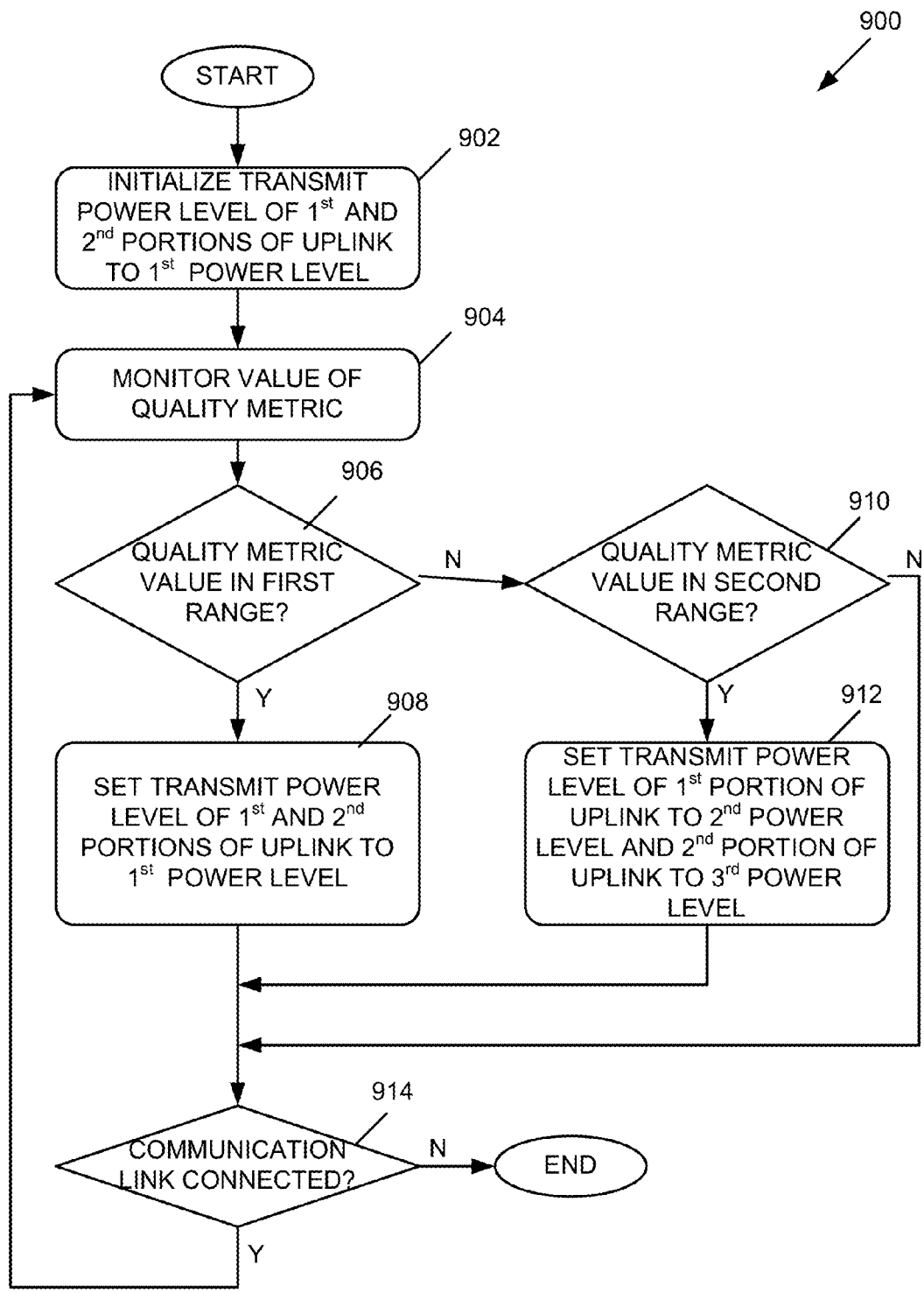
FIG. 9 illustrates a second representative method for improving the robustness of the communication link.

FIG. 9 illustrates a second representative method 900 for improving the robustness of a communication link between a mobile communication device and a base station. In step 902, a transmit power level for both a first portion and a second portion of uplink communications bursts from the mobile communication device to the base station can be set to a first power level. In step 904, a quality metric value can be monitored, just as in step 804 of FIG. 8. The quality metric value can be tested to determine if it falls within a first range in step 906. If it is determined in step 906 that the quality metric value falls within the first range, then the transmit power level of the first and second portions can be set to the first power level. If it is determined in step 906 that the quality metric value does not fall within the first range, then in step 910 the quality metric value can be tested to determine if it falls within a second range. If it is determined in step 910 that the quality metric values falls within a second range, then in step 912 the transmit level of the first portion of the uplink communication burst can be set to a second level (such as a boosted power level), while the second portion can be set to a third level (such as a reduced power level). By boosting the first portion and reducing the second portion of the transmitted uplink communication burst, the total average transmitted power can remain at or below the level when setting both first and second portions to the "normal" first power level. In step 914, it can be determined in the communication link remains connected, and if so, the monitoring, testing, and setting steps can be repeated.

Figure 10:
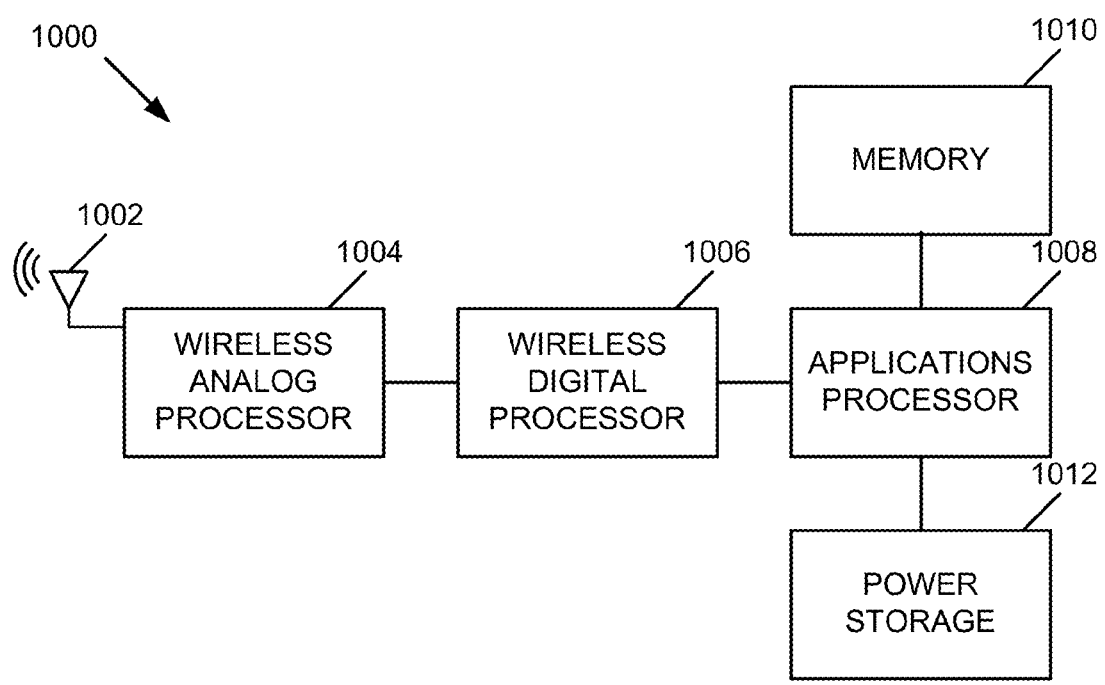
FIG. 10 illustrates a set of processing blocks of a representative wireless communication device.

FIG. 10 illustrates processing blocks 1000 for a mobile communication device that can enable improving the robustness of a communication link between the mobile communication device and a base station. A wireless digital processor 1006 can transmit and receive digital communication bursts that are amplified by a wireless analog processor 1004 before and after reception through an antenna 1002 respectively. Wireless data, such as compressed voice can be communicated from an applications processor 1008 to the wireless digital processor 1006, which formats, encodes and modulates the wireless data for transmission as an uplink communications burst. The wireless analog processor 1004 can amplify the uplink communications burst to an appropriate transmit power level. Either the wireless digital processor or the applications processor can set the transmit power level used for different portions of the uplink communications burst based on monitored quality metrics and/or power storage levels. Shaping different portions of the uplink communications burst so that the transmitted power level varies for each portion can be accomplished by varying the signal output by the wireless digital processor 1006 before amplification by the wireless analog processor 1004.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for improving robustness of a wireless communication link between a mobile device and a base station, the method comprising:
monitoring a quality metric value at the mobile device;
setting a transmit power level of a first portion of an uplink communication signal to a first transmit power level value when the monitored quality metric value is within a first range of quality metric values; and
setting the transmit power level of the first portion of the uplink communication signal to a second transmit power level value when the monitored quality metric value is within a second range of quality metric values;
wherein the second transmit power level value is greater than the first transmit power level value, thereby improving a robustness of the wireless communication link; and
wherein the quality metric value comprises a timing advance value set by the base station.

2. The method as recited in claim 1, further comprising:
initializing the transmit power level of the first portion of the uplink communication signal to the first transmit power level value; and
repeatedly monitoring the quality metric value and adaptively setting the transmit power level of the first portion of the uplink communication signal in accordance with the monitored quality metric value while the wireless communication link is connected.

3. The method as recited in claim 1, wherein the first portion of the uplink communication signal includes control signals used by the base station to maintain connection of the wireless communication link between the base station and the mobile device.

4. The method as recited in claim 1, further comprising:
monitoring a power storage metric value of the mobile device; and
setting the second transmit power level value based on the monitored power storage metric value.

5. A method for improving robustness of a wireless communication link between a mobile device and a base station, the method comprising:
monitoring a quality metric value at the mobile device;
setting a transmit power level of a first portion of an uplink communication signal to a first transmit power level value when the monitored quality metric value is within a first range of quality metric values;
setting the transmit power level of the first portion of the uplink communication signal to a second transmit power level value when the monitored quality metric value is within a second range of quality metric values, the second transmit power level value being greater than the first transmit power level value, thereby improving a robustness of the wireless communication link;
setting a transmit power level of a second portion of the uplink communication signal to the first power level value when the monitored quality metric value is in the first range of quality values, and
setting the transmit power level of the second portion of the uplink communication signal to a third power level value when the monitored quality metric value is in the second range of quality values;
wherein the third power level value is less than the first power level value.

6. The method as recited in claim 5, further comprising
initializing the transmit power level of the second portion of the uplink communication signal to the first power level value; and repeatedly monitoring the quality metric value and adaptively setting the transmit power level of the second portion of the uplink communication signal in accordance with the monitored quality metric value.

7. The method as recited in claim 5, wherein a total average transmit power across the first and second portions of the uplink communication signal when the first portion is set to the second power level value and the second portion is set to the third power level value is no more than when the first and second portions are set to the first power level value.

8. The method as recited in claim 5, wherein the quality metric value comprises a power control level value set by the base station.

9. The method as recited in claim 5, wherein the quality metric value comprises a received downlink transmission quality metric value measured by the mobile device.

10. The method as recited in claim 5, wherein the quality metric value measures indirectly a signal quality of uplink communication signals received at the base station from the mobile device, and the first portion of the uplink communication signal includes control signals used by the base station to maintain connection of the wireless communication link between the base station and the mobile device.

11. A mobile device, comprising:
a wireless interface, the wireless interface configured to communicate with a base station over a wireless link, the wireless link comprising an uplink communication signal transmitted from the mobile device to the base station;
a processor; and
a computer readable apparatus having a non-transitory storage medium with at least one computer program stored thereon, the at least one computer program configured to, when executed on the processor, cause the mobile device to:
monitor a quality metric value;
set a transmit power level of a first portion of an uplink communication signal to a first transmit power level value when the monitored quality metric value is within a first range of quality metric values; and
set the transmit power level of the first portion of the uplink communication signal to a second transmit power level value when the monitored quality metric value is within a second range of quality metric values;
wherein the second transmit power level value is greater than the first transmit power level value; and
wherein the monitored quality metric value comprises a timing advance set by the base station.

12. The mobile device as recited in claim 11, wherein the processor is further configured to:
initialize the transmit power level of the first portion of the uplink communication signal to the first transmit power level value; and
repeatedly monitor the quality metric value and adaptively set the transmit power level of the first portion of the uplink communication signal in accordance with the monitored quality metric value while the wireless communication link is connected.

13. The mobile device as recited in claim 11, wherein the first portion of the uplink communication signal includes control signals used by the base station to maintain connection of the communication link between the base station and the mobile device.

14. The mobile device as recited in claim 11, wherein the processor is further configured to:
monitor a power storage metric value of the mobile device; and
set the second transmit power level value based on the monitored power storage metric value.

15. A mobile device configured to improve a robustness of a wireless communication link with a base station, the mobile device comprising:
a processor;
a radio transceiver in signal communication with the processor; and
computerized logic in communication with the radio transceiver, the computerized logic configured to cause the mobile device to:
set a transmit power level of a first portion of an uplink communication signal transmitted to a first transmit power level value when the monitored quality metric value is within a first range of quality metric value;
set the transmit power level of the first portion of the uplink communication signal to a second transmit power level value when the monitored quality metric value is within a second range of quality metric values, where the second transmit power level value is greater than the first transmit power level value;
set a transmit power level of a second portion of the uplink communication signal to the first power level value when the monitored quality metric value is in the first range of quality values, and
set the transmit power level of the second portion of the uplink communication signal to a third power level value when the monitored quality metric value is in the second range of quality values, where the third power level value is less than the first power level value.

16. The mobile device as recited in claim 15, wherein the computerized logic is further configured to:
initialize the transmit power level of a second portion of the uplink communication signal to the first power level value; and
repeatedly monitor the quality metric value and adaptively set the transmit power level of the second portion of the uplink communication signal in accordance with the monitored quality metric value.

17. The mobile device as recited in claim 15, wherein a total average transmit power across the first and second portions of the uplink communication signal, when the first portion is set to the second power level value and the second portion is set to the third power level value, is no more than when the first and second portions are set to the first power level value.

18. A method for improving robustness of a wireless communication link between a mobile device and a base station, the method comprising:
monitoring a quality metric value and a power storage metric value at the mobile device;
setting a transmit power level of a first portion of an uplink communication signal to a first transmit power level value when the monitored quality metric value is within a first range of quality metric values; and
setting the transmit power level of the first portion of the uplink communication signal to a second transmit power level value when the monitored quality metric value is within a second range of quality metric values;
setting the second transmit power level based on the monitored power storage metric value;
wherein the second transmit power level value is greater than the first transmit power level value, thereby improving a robustness of the wireless communication link.

19. The method as recited in claim 18, further comprising:
initializing the transmit power level of the first portion of the uplink communication signal to the first transmit power level value; and
repeatedly monitoring the quality metric value and adaptively setting the transmit power level of the first portion of the uplink communication signal in accordance with the monitored quality metric value while the wireless communication link is connected.

20. The method as recited in claim 18, wherein the first portion of the uplink communication signal includes control signals used by the base station to maintain connection of the wireless communication link between the base station and the mobile device.

21. The method as recited in claim 18, wherein the quality metric value comprises a timing advance value set by the base station.

22. A mobile device configured to improve a robustness of a wireless communication link, the mobile device comprising:
a processor;
a radio transceiver in signal communication with the processor; and
computerized logic in communication with the transceiver, the computerized logic configured to:
monitor a quality metric value, the quality metric value comprising a timing advance value set by the base station; and
increase a transmit power level of a first portion of an uplink communication signal transmitted on the wireless communication link from the mobile device to the base station based on the monitored quality metric value.

23. The mobile device of claim 22, wherein the quality metric value measures indirectly a signal quality of uplink communication signals received at the base station from the mobile device, and the first portion of the uplink communication signal includes control signals used by the base station to maintain connection of the wireless communication link between the base station and the mobile device.

24. The mobile device of claim 22, the logic further configured to decrease a transmit power level of a second portion of the uplink communication signal transmitted on the wireless communication link from the mobile device to the base station based on the monitored quality metric value.

25. The mobile device of claim 24, wherein the decreased transmit power level of the second portion of the uplink communication signal balances the increased transmit power level of the second portion of the uplink communication signal, so that the average transmit power level of the uplink communication signal is approximately unchanged.

* * * * *